June 30, 1970     R. E. GUENTHER     3,517,987

FOUR ELEMENT TRIPLET PHOTOGRAPHIC OBJECTIVE

Filed June 10, 1968

RALPH E. GUENTHER
INVENTOR.

BY William F. Delaney
Robert W. Hampton

ATTORNEYS

United States Patent Office 3,517,987  
Patented June 30, 1970

3,517,987  
FOUR ELEMENT TRIPLET PHOTOGRAPHIC OBJECTIVE  
Ralph E. Guenther, Rochester, N.Y., assignor to Eastman Kodak Company, Rochester, N.Y., a corporation of New Jersey  
Filed June 10, 1968, Ser. No. 735,869  
Int. Cl. G02b 9/20  
U.S. Cl. 350—227                                1 Claim

ABSTRACT OF THE DISCLOSURE

A triplet objective with a diaphragm between the rear two components is disclosed in which the front component is a simple positive meniscus element concave toward the diaphragm, the middle component is a simple negative biconcave element, and the rear component is a compound biconvex positive component consisting of two cemented elements of opposite refractive power with the cemented surface convex toward the diaphragm.

BACKGROUND OF THE INVENTION

This invention relates to four element, three component photographic objectives which are well corrected for all aberrations. More specifically, this invention relates to photographic objectives comprising three airspaced components with a stop between the rear two components, namely a simple positive meniscus front component concave to the rear (i.e. the short conjugate side), a simple negative biconcave middle component, and a compound positive rear component which consists of two cemented elements of opposite refractive power with the cemented surface convex towards the middle element.

SUMMARY OF THE INVENTION

It is an object of this invention to provide an improved four element triplet photographic objective which is exceptionally well corrected at relative apertures up to $f/2.7$ and at a maximum half-field angle of 27° for spherical, comatic, astigmatic and chromatic aberrations, for field curvature and distortion.

Further objects and advantages will be found in the details of construction disclosed in the accompanying examples and drawings.

These objects are accomplished according to the present invention by four element, three component lenses of the type described above in which the indexes of refraction of the front and rear convergent elements with respect to the D line of the spectrum (587.6 m$\mu$) are approximately 1.73, and the indexes of refraction of the two divergent elements are greater than 1.61. The use of such high refractive indexes reduces spherical aberration both on and off the optical axis and permits the selection of surface curvatures to provide an exceptionoally flat field.

DETAILED DESCRIPTION OF THE DRAWINGS

Figure 1:
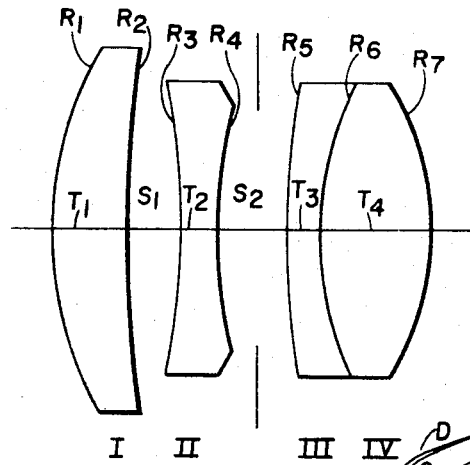
FIG. 1 is a sectional view of a photographic objective lens embodying the invention with the long conjugate on the left.

The lens in FIG. 1 comprises three airspaced components, namely a simple positive meniscus front element I convex to the front (i.e. the long conjugate side), a simple negative biconcave middle element II, and a compound positive rear component which consists of two cemented elements III and IV of opposite refractive power with the cemented surface convex toward a stop between elements II and III. Element III is convex-concave, and element IV is biconvex.

Numerical data for constructing a photographic objective of focal length $f=100$ according to this invention as outlined above is given in the following table, in which the lens elements are numbered from front to rear, $N_d$ is the index of refraction of each lens element for the D line of the spectrum, V is the index of dispersion, and R, T and S refer respectively to the radii of curvature of the lens surfaces, the thicknesses of the lens elements and the airspaces between the elements, numbered by subscript from front to rear:

EXAMPLE  
$f=100 \quad f/2.7$

| Lens | $N_D$ | V | Radii | Thicknesses and spacings |
|---|---|---|---|---|
| I | 1.7340 | 51.0 | $R_1=38.97$ | $T_1=10.69$ |
|   |        |      | $R_2=494.63$ | $S_1=5.80$ |
| II | 1.6725 | 32.0 | $R_3=-98.60$ | $T_2=3.44$ |
|    |        |      | $R_4=34.45$ |  |
| Diaphragm |  |  |  | $S_2=8.87$ |
| III | 1.6170 | 36.6 | $R_5=432.69$ | $T_3=2.89$ |
|     |        |      | $R_6=42.85$ |  |
| IV | 1.7445 | 45.6 | $R_7=63.35$ | $T_4=8.73$ |

Figure 2A:
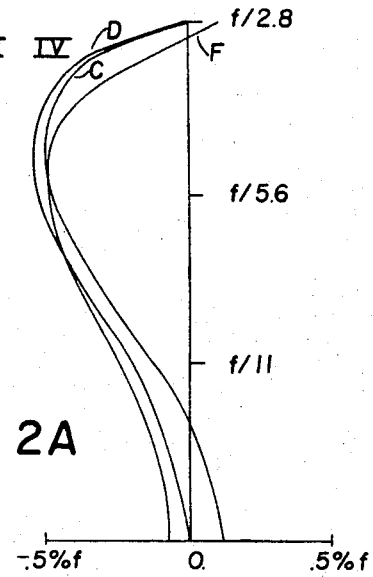
FIG. 2 comprises a set of correction curves for the lens disclosed in the example below, showing (A) spherical aberration for the C, D and F lines of the spectrum, and (B) sagittal and tangential astigmatism.
Figure 2B:
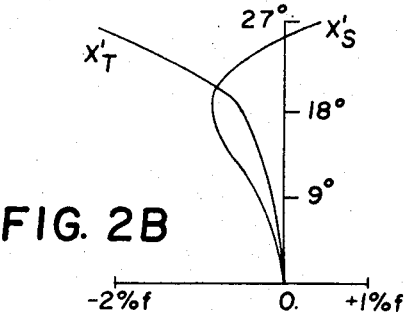

As shown by the curves in FIG. 2, the above lenses are corrected to such a degree that spherical aberration for the C, D and F lines of the spectrum are all less than .6% of the effective focal length of the objective, and the sagittal and tangential astigmatisms have a node at 20° half-field angle which is within 1% of the focal length. Distortion is less than 1%.

Figure 3:
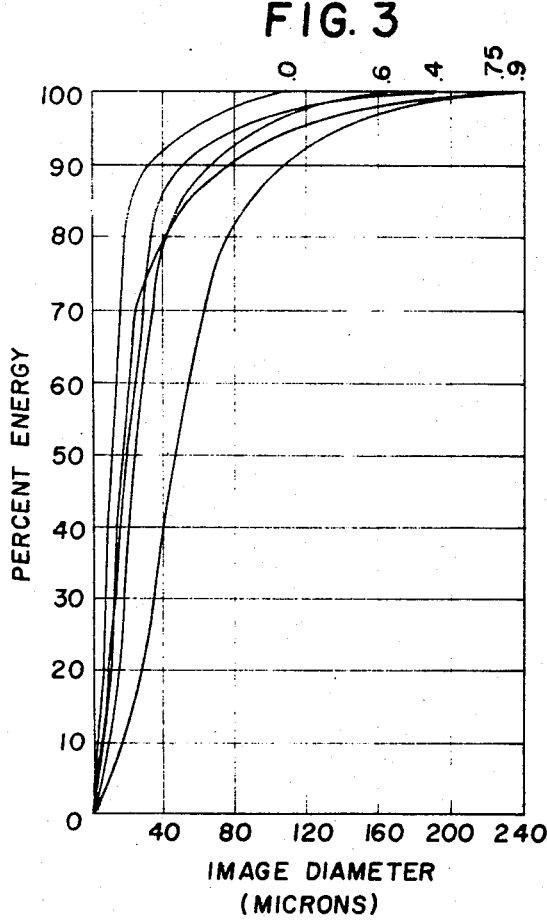
FIG. 3 comprises a set of curves for the lens disclosed in the example below showing the energy distribution of light rays passing through the lens constructed at a focal length of 37.7 mm. and used at an infinite conjugate at a relative aperture of $f/2.7$ with the rays incident at 0, .4, .6, .75 and .9 of the full field of the lens which covers a half-field angle of 27°.

As shown by the curves in FIG. 3, the above lens gives exceptionally high resolution. For example, it will be seen that approximately 80% of the light rays at a half-field angle of 27° are imaged by the lens within a spot having a diameter of 80 microns when the lens is used at an infinite conjugate.

The invention has been described in detail with particular reference to preferred embodiments thereof, but it will be understood that variations and modifications can be effected within the spirit and scope of the invention as

I claim:

1. A photographic objective, having an equivalent focal length $f=100$, and comprising three spaced, optically aligned components, the front component being a simple positive meniscus element concave to the rear, the middle component being a simple negative biconcave element, and the rear component consisting of two cemented elements of opposite refractive power, the cemented surface of said rear component being convex towards the front, the lens elements having substantially the following characteristics and spatial relations in which the lens elements are numbered from the front, $N_d$ is the index of refraction for the D line of the spectrum, V is the index of dispersion, and R. T and S refer respectively to the radii of curvature of the lens surfaces, the axial thicknesses of the lens elements, and the axial spacings between the lens elements, numbered by subscript from front to rear:

| Lens elements | $N_D$ | V | Radii | Thicknesses and spacings |
|---|---|---|---|---|
| I | 1.73 | 51.0 | $R_1=39.0$ | $T_1=10.7$ |
|   |      |      | $R_2=494.6$ | $S_1=5.8$ |
| II | 1.67 | 32.2 | $R_3=-98.6$ | $T_2=3.4$ |
|    |      |      | $R_4=34.5$ | $S_2=8.9$ |
| III | 1.62 | 36.6 | $R_5=432.7$ | $T_3=2.9$ |
| IV | 1.74 | 44.9 | $R_6=42.9$ | $T_4=8.7$ |
|    |      |      | $R_7=-63.4$ | |

References Cited

UNITED STATES PATENTS 3,420,602  1/1969  Eggert et al. _____ 350—227

JOHN K. CORBIN, Primary Examiner